(12) United States Patent
Schneider

(10) Patent No.: US 11,732,495 B2
(45) Date of Patent: Aug. 22, 2023

(54) IMPULSE TUNED MASS DAMPER FOR TALL, SLIM STRUCTURES

(71) Applicant: ESM ENERGIE-UND SCHWINGUNGSTECHNIK MITSCH GMBH, Heppenheim (DE)

(72) Inventor: Lukas Schneider, Heppenheim (DE)

(73) Assignee: ESM Energie-und Schwingungstechnik Mitsch GmbH, Heppenheim (DE)

( * ) Notice: Subject to any disclaimer, the term of this patent is extended or adjusted under 35 U.S.C. 154(b) by 137 days.

(21) Appl. No.: 17/415,995

(22) PCT Filed: Dec. 19, 2019

(86) PCT No.: PCT/EP2019/000348
§ 371 (c)(1),
(2) Date: Jun. 18, 2021

(87) PCT Pub. No.: WO2020/126070
PCT Pub. Date: Jun. 25, 2020

(65) Prior Publication Data
US 2021/0317676 A1    Oct. 14, 2021

(30) Foreign Application Priority Data
Dec. 21, 2018   (EP) .................................... 18000995

(51) Int. Cl.
*E04H 9/02*          (2006.01)
(52) U.S. Cl.
CPC .......... *E04H 9/0215* (2020.05); *E04H 9/023* (2013.01)

(58) Field of Classification Search
CPC ..... E04H 9/0215; E04H 9/023; E04H 9/0235; Y02E 10/72; Y02E 10/728; F03D 13/20
See application file for complete search history.

(56) References Cited

U.S. PATENT DOCUMENTS 4,483,684 A  *  11/1984  Black ................ F16F 15/12313
                                                  192/214.1
8,746,663 B2      6/2014  Mitsch
(Continued)

FOREIGN PATENT DOCUMENTS

EP          2 378 118 A2     10/2011
WO       2011/088965 A2      7/2011
(Continued)

OTHER PUBLICATIONS

International Search Report Corresponding to PCT/EP2019/000348 dated Mar. 19, 2020.
(Continued)

*Primary Examiner* — Brian E Glessner
*Assistant Examiner* — Daniel J Kenny
(74) *Attorney, Agent, or Firm* — Finch & Maloney PLLC

(57) ABSTRACT

An impulse damper device, which is specifically provided for the construction or the dismantling of tall, slim constructions, in particular towers and preferably towers of wind turbines, in order to minimize or eliminate undesired vibration states, which often occur during the construction or taking apart and lead to large increases in the vibration amplitudes of the vibration system. The impulse tuned mass dampers are preferably provided for temporary mobile use, but, in principle, are also suitable for permanent use.

17 Claims, 4 Drawing Sheets

(56) References Cited

U.S. PATENT DOCUMENTS

| | | |
|---|---|---|
| 9,657,717 B2 | 5/2017 | Ollgaard et al. |
| 11,384,558 B2 * | 7/2022 | Dicleri .................... E04H 9/023 |
| 2007/0110578 A1 * | 5/2007 | Stommel ................. F03D 80/00 |
| | | 416/132 B |
| 2011/0017561 A1 * | 1/2011 | Tanaka .................. E04H 9/0215 |
| | | 188/266 |
| 2016/0130805 A1 * | 5/2016 | Ruan ....................... F16F 15/06 |
| | | 52/167.4 |
| 2019/0055982 A1 | 2/2019 | Mitsch |
| 2020/0284240 A1 | 9/2020 | Mitsch |

FOREIGN PATENT DOCUMENTS

| | | |
|---|---|---|
| WO | 2017/144167 A1 | 8/2017 |
| WO | 2019/029839 A1 | 2/2019 |

OTHER PUBLICATIONS

Written Opinion Corresponding to PCT/EP2019/000348 dated Mar. 19, 2020.

* cited by examiner

IMPULSE TUNED MASS DAMPER FOR TALL, SLIM STRUCTURES

The invention relates to an impulse damper device which is specifically provided for the construction or dismantling of tall, slim structures, in particular towers and preferably towers of wind turbines, in order to minimize or to eliminate in particular undesirable vibration states of the installation, preferably in a frequency range below 10, preferably below 5 Hz, which experience has shown occur especially in the incomplete or unfinished state and can lead to large and unforeseeable increases in the vibration amplitudes, initiated by wind, waves or earth shocks, of the vibration system. The impulse tuned mass dampers according to the invention are preferably intended for temporary mobile use during the construction phase or the disassembly of the structure, but are in principle also suitable for permanent use.

When constructing wind turbines, the tower is usually constructed first in segments. Then the nacelle is mounted together with the rotor. The situation without the nacelle (tower stub alone) is to be viewed as critical with regard to resonance excitation, since in this state larger vibration amplitudes can occur than is the case with the nacelle. The mass damper is placed on the end of the uppermost tower segment, for example, and screwed there. This process is repeated until the tower is completely constructed and the nacelle can be fitted. It is also possible to temporarily mount the mass damper on the already attached nacelle in order to facilitate the assembly of the rotor blades in terms of vibration.

The natural frequency of the installation changes as the assembly or disassembly progresses and the frequency of the mass damper therefore has to be able to be adapted accordingly.

Vibration mass dampers of the prior art usually consist of the following three units: damping mass, damper unit and spring unit.

In the overall system, these three items are usually present as separate units. The spring unit is used to adapt the frequency of the mass damper to the given conditions on site. The damper unit is required to generate a broad damping effect. The spring unit usually consists of steel springs or resilient elements.

Stop dampers or impulse dampers are known in principle in the prior art. In the event of vibrations through the main system, for example a wind turbine, the mass provided for the damping hits a wall of the installation, which usually consists of concrete, steel or hybrid materials. An impulse occurs of which the direction is opposite to the direction of movement of the installation. This gradually calms the main system down.

A wind turbine comprising an impulse damper for damping the first tower natural frequency is described, for example, in U.S. Pat. No. 9,657,717 B2. The impulse damper is accommodated in the upper structure of the tower and comprises an independent damper housing which is attached to said upper structure. The damper housing is cylindrical and is provided with a flat bottom. Inside the damper housing there is a disk-shaped damper mass which is physically smaller than the surrounding housing and can be moved on the floor of the housing via rollers. When the system moves, the damping disks hit the inside of the damping housing via damping elements and thus reduce the excitation vibration. In practice, however, this damper system is not optimally effective when used as a construction damper, in particular in large installations, since only moderately strong damping can be achieved thereby.

The object was therefore to provide an impulse vibration damper which is able to exert a strong damping effect for large vibration amplitudes during assembly or disassembly of a tall, slim structure, e.g., a wind turbine.

SUMMARY OF THE INVENTION

The mass damper device according to the invention works on the principle of stop damping and is suitable for damping in particular the first natural frequency of a structure/tower to be damped, in particular a wind turbine, which frequency is effective in particular at the upper end of the high structure/tower. In principle, the second tower natural frequency can also be damped by such a damper.

The tuned mass damper presented here is not only characterized by its effectiveness in terms of damping the first or second natural frequency and the associated reduction in larger vibration amplitudes, but also by its high degree of mobility and easy handling when constructing or disassembling the tall, slim structure, in particular a wind turbine, as the tower continues to be built or taken apart, since said tower, due to its height of over 100 m in the case of wind turbines, is made up of different individual segments which have to be joined together in a modular manner during assembly or separated from one another during or during disassembly (dismantling of the installation), as a result of which the entire vibration system changes permanently and can lead to problems. In principle, the impulse damper according to the invention is also suitable for permanent operation.

The invention therefore relates to an impulse damper that is easy to assemble and disassemble and is intended for a tall, slim structure, in particular a wind turbine, in particular during construction or dismantling. The impulse damper according to the invention prevents or reduces uncontrolled vibrations, in particular large harmful vibration amplitudes, which occur more strongly in particular during the construction or disassembly of the structure and can lead to damage to the installation. The impulse damper according to the invention is preferably reusable and is therefore intended for mobile application when assembling or disassembling a tall, slim structure that is susceptible to vibration, in particular a wind turbine, but is also suitable for permanent use.

The invention therefore relates in particular to an impulse damper device for damping vibrations in an installation, which vibrations occur in particular during the construction or disassembly of a tall, slim structure, in particular made up of individual segments, such as the tower of a wind turbine, the device comprising the following structural elements:

(i) a fixed support device (2) which has two or more, preferably three or four support arms (2.2) that are interconnected at one end, point outwards in a star shape with respect to one another with the other free end, and are arranged in a horizontal plane, (ii) a movable mass (3) comprising one or more parts is arranged above or below or between the two or more support arms (2.2) of the horizontally oriented support device (2), and is mounted movably relative to said support device, (iii) at least one sliding/friction or rolling device (4) which is arranged and designed so as to allow relative movement between the support device (2) and the movable, vibratable mass (3), and (iv) at least one stop device (7) which comprises one or more stop elements (7.1, 7.2) and is provided for the movable mass (3) hitting the fixed support device (2), thereby causing the vibrations that have occurred in the installation to be reduced or eliminated by means of impulse damping by the mass moved by applied forces hitting the fixed support device, the stop device (7) being arranged such that the movable mass (3) cannot be rotated about the vertical axis, as a result of which a torsional moment about the vertical axis can be transmitted, and the stop device is functionally effective in a tangential direction relative to the longitudinal axis of the slim structure. The arrangement of each of the individual stop elements (7.1) (7.2) according to the invention is preferably unidirectional and has the effect that any circular movements of the tall, slim structure can be damped.

In a particular embodiment of the invention, the movable mass (3) comprising one or more parts forms a closed ring which is movably connected, via said stop device and said slide/friction/rolling device, to the free ends of the support arms (2.2) of the support device (2). The ring structure can be a mass unit, but it can also be composed of different ring segments. The size of the ring structure of the impulse damper is preferably based on the size or the diameter of the tall, slim structure or tower. A mass unit deviating from the ring shape is also conceivable in principle.

As already mentioned at the beginning, the impulse damping is based on a movable mass hitting a stationary structure. The stop design is therefore of particular importance.

The invention therefore relates in particular to a corresponding impulse damper in which the stop device (7) has stop elements (7.1) (7.2) which are attached to the two, three, four, five or six support arms (2.2) of the star-shaped support device (2) and/or are attached to the moving mass (3), said stop elements preferably being attached in a tangential direction with respect to the longitudinal axis of the slim structure.

The stop elements (7.1) of the stop device (7) of the impulse damper according to the invention comprise, in a first embodiment, purely resilient or resiliently damping elements, in particular resilient layer elements made of rubber layers (7.1.1) and intermediate metal sheets (7.1.2). Two- to five-layer elements are usually used, which are preferably oriented vertically with respect to the horizontal plane of the support device. In addition to said flat layer elements, corresponding cone elements or sockets made of elastomer—metal layers can also be used.

The stop elements (7.2) of the stop device (7) of the impulse damper according to the invention comprise, in a second embodiment, resiliently/hydraulically damping elements made of resilient flat layer elements (7.2.0) or resilient cone or socket bodies made of rubber layers and intermediate metal sheets, as described above, as well as hydraulic elements (7.2.1) (7.2.2) (7.2.3) (7.2.4), as described in more detail below. Using hydraulics, it is possible not only to modify the stiffness of the resilient parts but also to change the damping over a larger range than is possible with pure resilient elements.

Said stop elements (7.1) (7.2) of the stop device (7) are arranged, in another embodiment of the invention, such that a first stop element ((7.1) or (7.2)) is attached to the movable mass (3) and a second stop element (7.1) (7.2) is attached to the opposite part of the fixed support element (2) (2.2), and these stop elements are separated from one another by a movement space or gap in the inactive state of the damper.

When the mass (3) moves, it slides, per the design according to the invention, at particular points which are in contact with the fixed support device (2), over the corresponding points on the support arms (2.2), preferably at their outwardly projecting ends. The space required for this sliding/frictional movement has to be selected so as to be sufficiently large on the support arms. The sliding elements have to be arranged such that they are positioned as optimally as possible with respect to the stop elements, so that sliding (or rolling in the case of rolling elements) of the corresponding parts of the mass (3) against the stops (7) is ensured.

The invention therefore relates to a corresponding impulse damper, in which the sliding/friction or rolling device (4) has corresponding functional elements (4.1) (4.2) (4.3) at particular positions of the moving mass (3) and on the support arms (2.2) of the support device (2). The coefficient of friction of the sliding/friction device (4) between the support device (2) and the moving mass (3) should have a value between 0.04 and 0.6, preferably between 0.05 and 0.5.

Since the friction lining of the sliding/friction device wears out under heavy loads and parallel guidance of the elements on the mass and on the support arm is no longer ensured, a compensating device (4.4) can be provided.

In another embodiment of the invention, the impulse damper device has a mechanical or electronic, manual or remote-controlled locking device (3.1), with the aid of which the moving mass (3) can be secured relative to the support device (2).

The support device (2) of the impulse damper according to the invention usually has fastening elements (2.1) by means of which it can be securely but optionally re-releasably connected, directly or via a correspondingly designed flange (1), to the slim structure or, preferably, to the particular uppermost segment of this structure. This flange (1) is first mounted on the edge of the structure during assembly. This is followed by the connection of the actual impulse damper to the support arms (2.2) via the parts (2.1) and the support device (2) to be securely mounted.

As already stated above, the impulse damper according to the invention is ideally suited for damping vibrations, for example in a wind turbine during the construction or disassembly of the tower, the nacelle or the rotor blades.

The invention therefore finally also relates to an under-construction wind turbine comprising a reusable mobile impulse damper device as described above, below and in the claims, which has been mounted on the uppermost segment of the tower or on the nacelle during the assembly or disassembly of the wind turbine.

Figure 1:
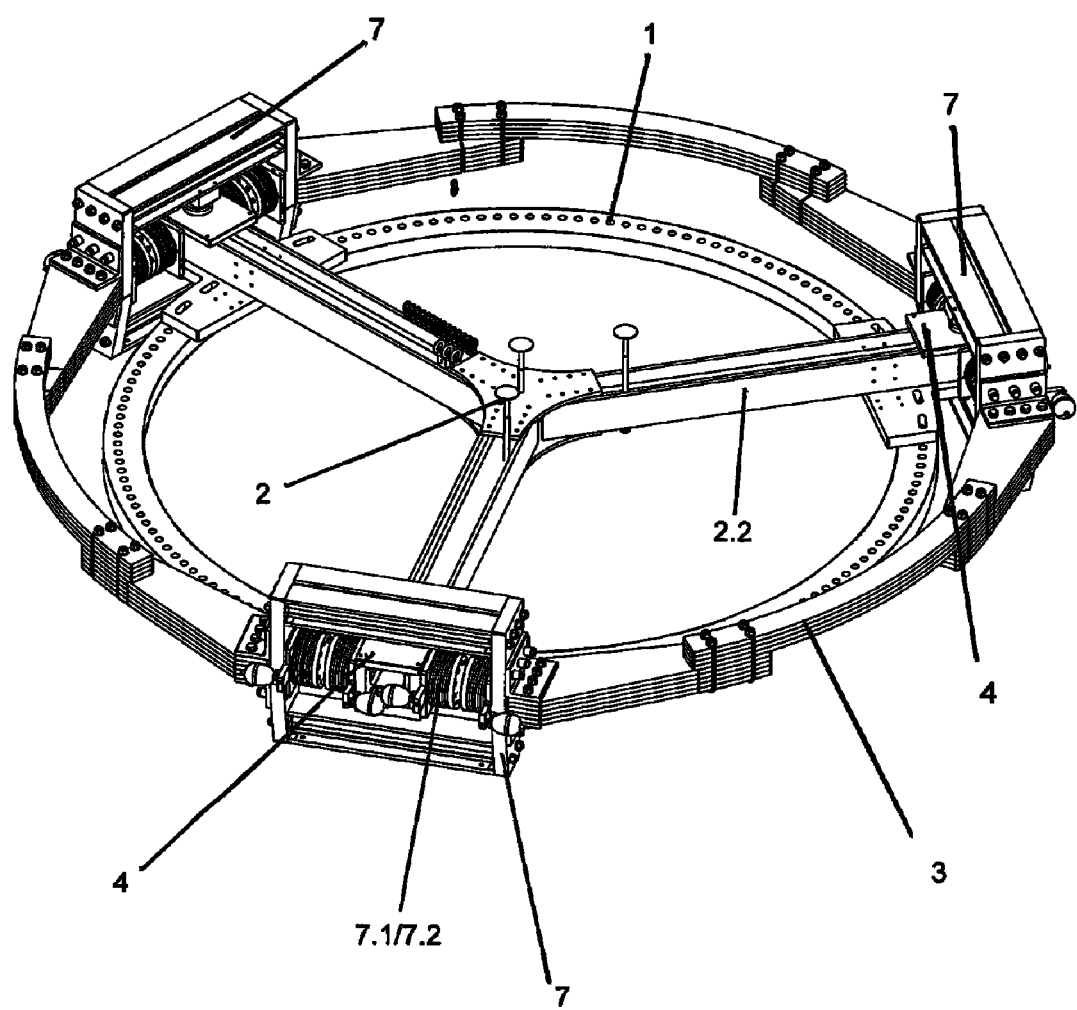
FIG. 1 is a perspective view of the impulse damper device according to the invention including connection to the tower or a tower segment of a wind turbine.

Each support arm (2.2) of the device has, on the upper side at its free end, sliding elements, which are functionally connected to sliding elements on the lower side of the annular moving mass (3). Furthermore, in this region, the device according to FIG. 1 has hydraulic-elastomeric stop elements (7) (7.2) which are arranged tangentially on the support arm and on the movable annular mass (7), such that the mass can hit on both sides. The distance (5) between the stop points determines the relative freedom of movement via the sliding elements (4) and thus the point in time and the strength of the damping caused by hitting the stop elements. The sliding elements and stop elements are arranged such that they take up little space. The stop elements comprise vertically arranged elastomer—metal layer elements (having 2, 3, 4, 5, or 6 layers), which can compress along their vertical axis when hit. If less stiffness and damping is desired, said layer elements can also be arranged such that their vertical axis is arranged perpendicularly to the horizontal plane of the support device.

The support device (2) or the star-shaped arrangement of the support arms (2.2) is provided in its center with suitable fittings which fix the star, or hold the star together, in the middle. A fastening (2.1) for connection to the tower, optionally to a flange (1), is provided on each support arm (2.2) at or within the radius of the structural wall, which is round in this case.

The impulse damper is also provided according to the invention with purely resilient stop elements (7.1). This corresponds to the embodiment according to FIG. 1, but without hydraulic support of the elastomeric layer elements.

Figure 2:
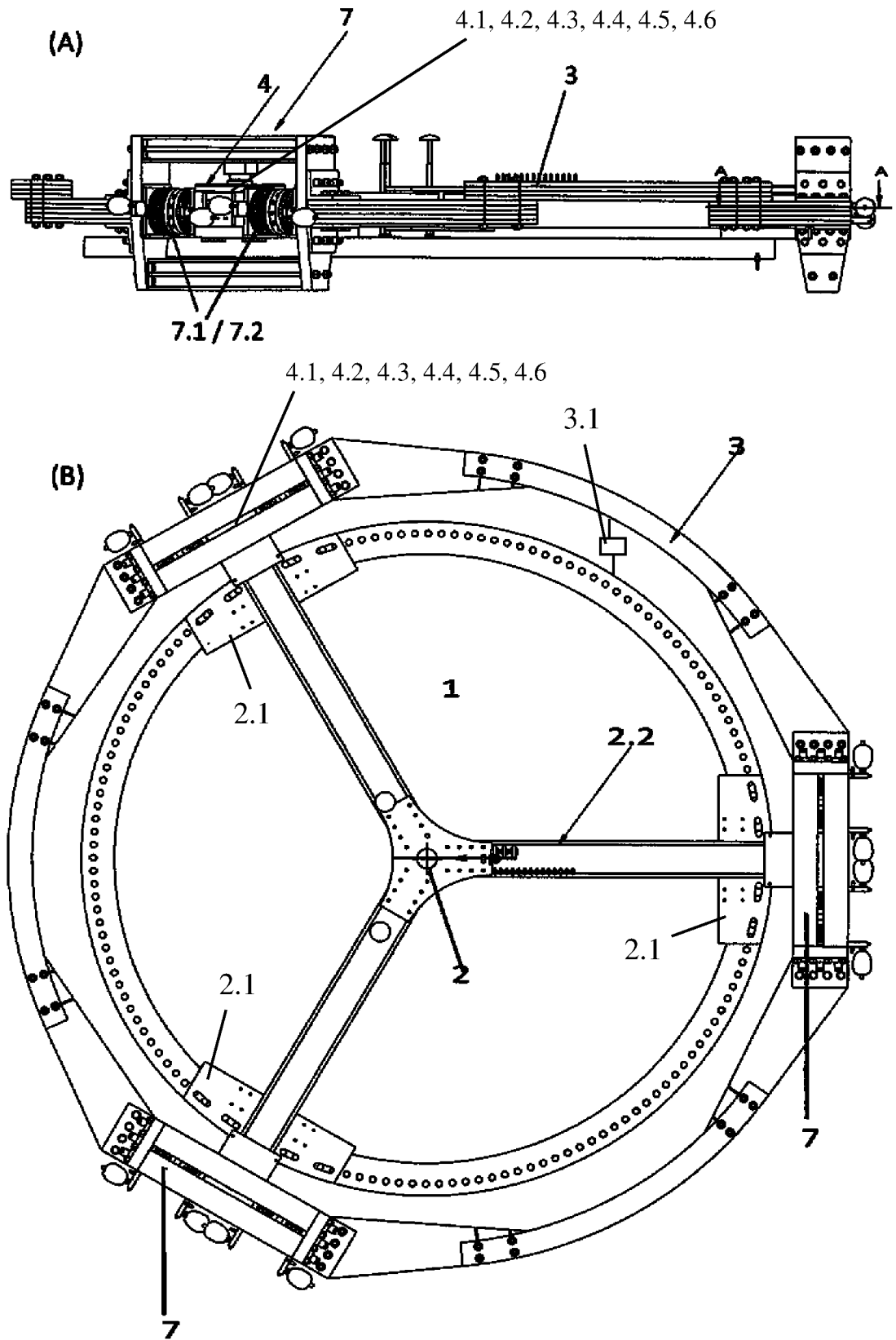

FIG. 2 is a side view (A) and a top view (B) of the impulse damper according to the invention according to FIG. 1, including the tower flange (1)

Figure 3:
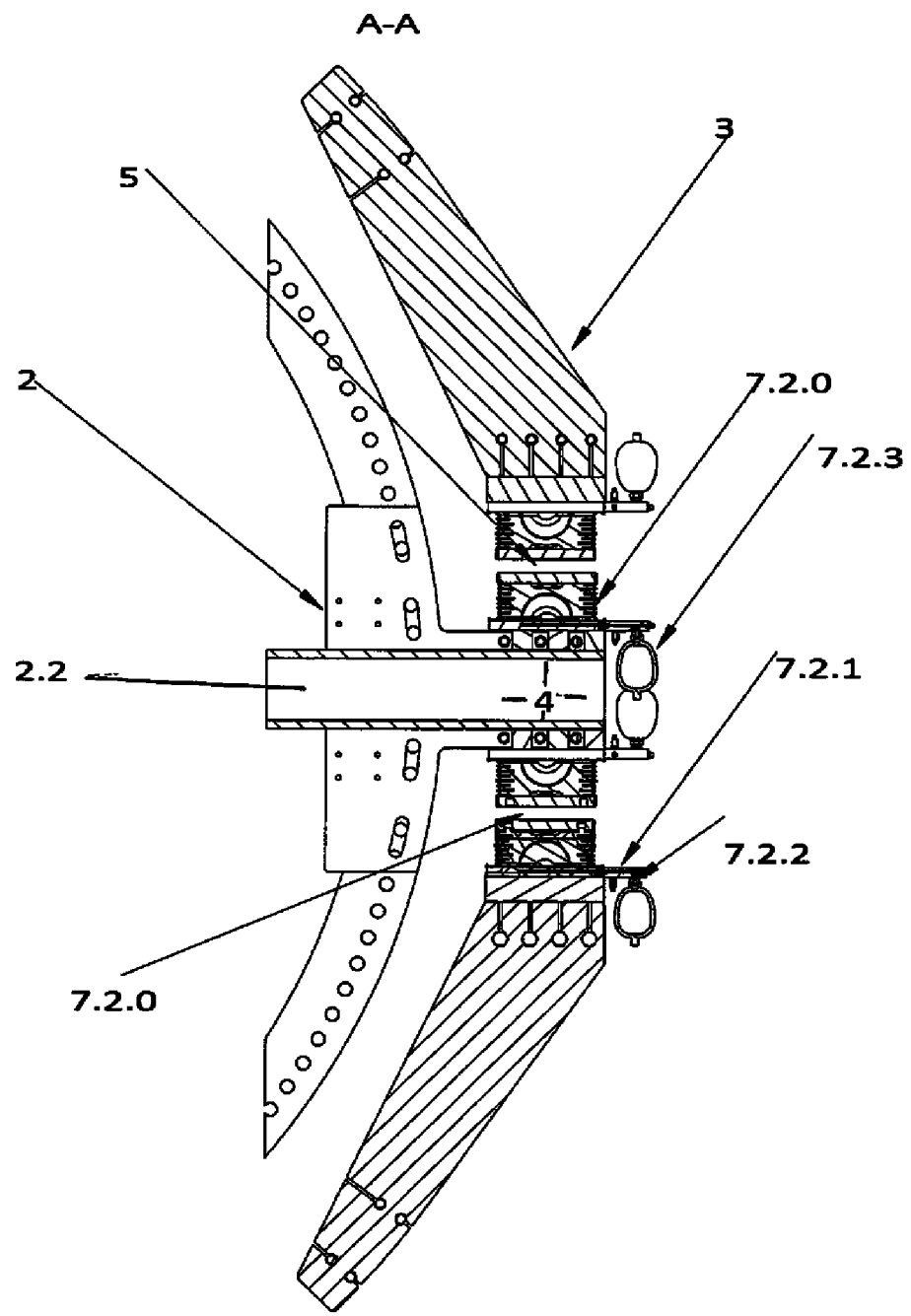

FIG. 3 shows a cross section/detail of the impulse damper from FIG. 1, having a hydraulic-elastomeric stop (7.2) fastened to the movable mass (3) and at the end of a support arm (2.2), respectively. A movement-play space (5) as far as the stop is provided between the two elements. Each support arm (2.2) has such a pair of stop elements (7.2) tangentially on both sides (stop on both sides).

Figure 4:
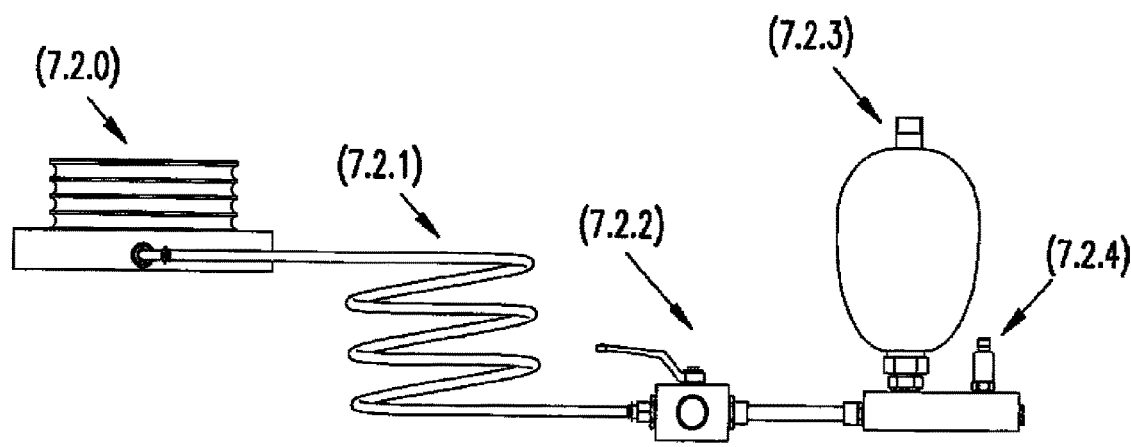

FIG. 4 shows a sketch of the arrangement of the hydraulic components of the hydraulic-elastomeric stop element (7.2). Reference sign (7.2.0) represents the rubber—metal-sheet layer element, reference sign (7.2.1) represents the longer hydraulic line, reference sign (7.2.2) represents the control throttle, reference sign (7.2.3) represents the container for the hydraulic medium (liquid/gas), and reference sign (7.2.4) represents the control valve.

Figure 5:
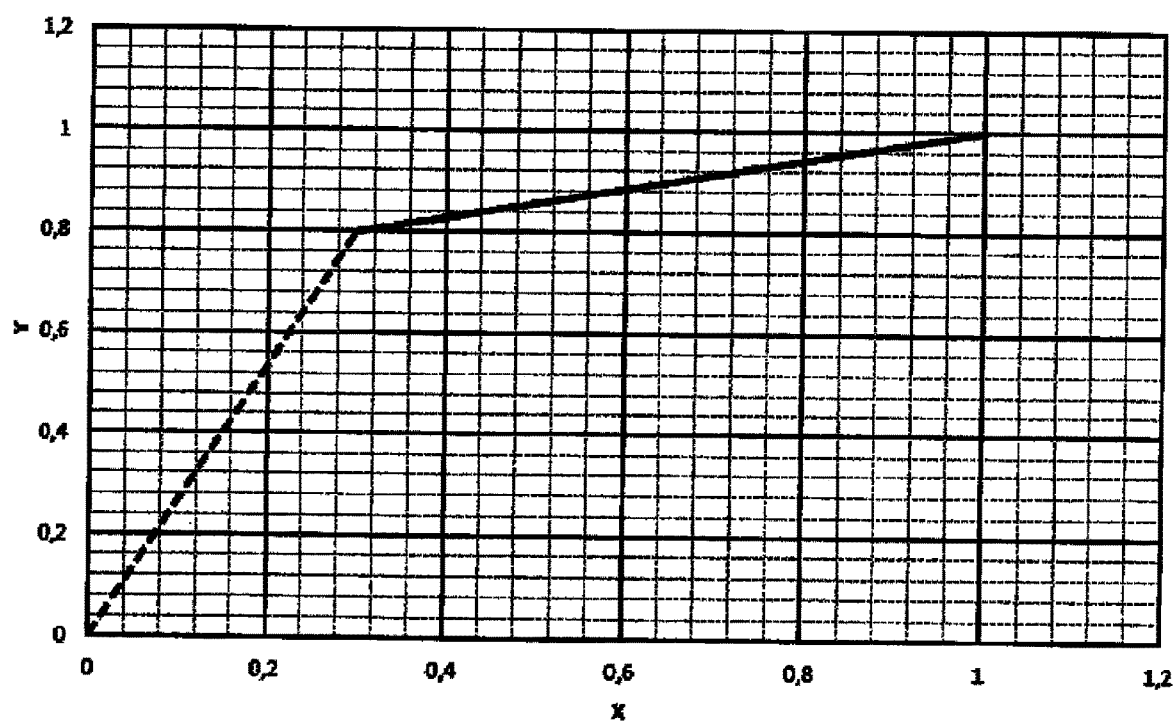

FIG. 5 shows a load—displacement characteristic curve of the hydraulic-elastomeric stop (7.2) according to the invention. The (normalized) spring displacement is shown on the X-axis and the normalized load is shown on the Y-axis. The dashed, steeper line shows the course while the diaphragm accumulator (7.2.3) is closed. After opening the valve (7.2.2), liquid now flows into the diaphragm accumulator and a flatter (solid) course is obtained, which represents increased damping.

DETAILS OF THE INVENTION

An impulse damper according to the invention for a wind turbine is described in more detail below, by way of example.

The impulse damper has the following features, by way of example:
(i) an upright support device (2) which is connected to the wind turbine or the tower or a tower segment and has at least two, preferably three to six, equal-length support arms (2.2) that are interconnected at one end, point outwards in a star shape with respect to one another with the other free end, maintaining a preferably identical angle (3-arm: 120°; 4-arm: 90°; 5-arm: 72° and 6-arm: 60°), and are arranged in a horizontal plane. Using an impulse damper having only two opposite arms, damping can be achieved only in one direction, but such an impulse damper has the advantage that it only requires a small amount of space.
(ii) a movable mass (3) which has a substantially annular structure and is preferably arranged above the horizontally oriented support device (2) and is movably mounted thereon, preferably in the outer regions of the support arms (2.2)
(iii) a sliding/friction device (4) between said support device (2) and said movable mass (7), and
(iv) a stop device (7) comprising one or more stop elements (7.1) (7.2) for the movable mass (3) hitting the support device (2).

The movable mass (3) rests on the particular outer region of the radially outwardly pointing support arms (2.2) of the support device (2) by means of said sliding device such that, when vibrational forces act on the installation, said mass is able to move relative to the upright support device as far as said stop device, as a result of which the vibrations that have occurred in the installation are reduced or eliminated by means of impulse damping when the mass hits.

The support device (2) has, for example on the underside of the support arms (2.2), fastening elements (2.1) by means of which said device can be securely but optionally re-releasably connected, directly or via an annular flange (1)), to the wind turbine or to the particular uppermost segment of the tower of a wind turbine to be constructed.

The sliding device (4) comprises elements (4).1) (4.2) (4.3) which are securely connected to the movable mass (3), preferably on its underside, and corresponding elements which are connected to the fixed support device (2), preferably on the top of the relevant support arms (2.2).

In another embodiment of the invention, the sliding device has, either in the region of the sliding elements on the mass or in the region of the sliding elements on the support device, a compensating device (4.4) which ensures parallel guidance of said sliding elements on the support arms (2.2) and on the moving mass (3) in the event of wear of said sliding elements during operation.

According to the invention, the sliding elements are to be selected such that the coefficient of friction of the relevant elements between the support device (2) and the elements of the moving mass (3) has a value between 0 and 0.6, preferably between 0.4 and 0.6, in particular between 0.05 and 0.4.

The elastomeric or hydraulic-elastomeric stop elements (7.1) (7.2) according to the invention are connected to the support device (2) or its support arms (2.2) as well as to the annular structure of the moving mass (3), or mass parts. In a preferred embodiment of the invention, the stop device is arranged in the outer third of the support arms and of the movable mass (3) resting at said point via the sliding device. Since each stop element is preferably effective in a preferred direction, the stop elements are arranged on the support structure (2) such that they functionally sufficiently cover all directions in a 360° angle.

In a preferred embodiment of the invention, said stop elements are attached in a tangential direction with respect to the annular structure of the moving mass (3). This arrangement is particularly space-saving. In general, however, the stop device can also be designed and arranged such that it blocks radial movements.

The stop elements can be rigid or resilient. However, they preferably comprise purely resilient elements (7.1), which are designed, for example, as per se known layer elements made of resilient material and metal sheets (7.1.0), and are arranged vertically or horizontally, preferably vertically. By appropriate selection of the elastomer material and the layer thicknesses, it is possible to influence the stiffness and thus not only the actual impulse damping but also the overall damping properties of the device by means of resilient damping. The stop elements can, however, also comprise resilient elements (7.2) which consist of corresponding layer elements (7.2.0) that are provided with hydraulic means (7.2.1) (7.2.2) (7.2.3) (7.2.4), as a result of which the stiffness of the resilient material as well as the damping of the system can be modified In another embodiment of the invention, the impulse damper described and claimed herein has a mechanical and/or electronic locking device (3.1) which can be controlled manually or remotely and is intended to prevent relative movement between the support device and the moving mass (3) in particular operating, transport or assembly states.

If an impulse damper according to the invention is designed so as to have stops (7.1) that consist exclusively of elastomer and metal, the damping that can be achieved is determined by the elastomer and cannot be increased further beyond this limit.

For particular applications, higher damping values may also be required. According to the invention, a hydraulic-elastomeric stop element (7.2) is used therefor, as described in more detail below (see also the drawings). Such a hydraulic-resilient system (7.2) consists, for example, of an elastomeric-hydraulic element (7.2.0) which is connected to a diaphragm accumulator (7.2.3) via a hose (7.2.1) and optionally via a throttle (7.2.2) (FIG. 4). Said diaphragm accumulator is filled with a hydraulic medium (liquid/gas). Such a hydraulic-elastomeric stop can be installed on the upright support part (2) or on the moving mass part (3) or on both components.

In another embodiment, such a hydraulic-elastomeric stop (7.2) is combined with a purely elastomeric stop (7.1), the stop (7.1) being attached to the fixed support part and the stop (7.2) being attached to the movable mass parts (3), or vice versa.

A system is also conceivable in which a hydraulic-elastomeric stop according to the invention is installed on the upright or moving part, and a conventional damping/spring element is installed on the particular opposite side.

If the upright support part (2) and the moving mass part (3) hit, the liquid is displaced from the elastomeric-hydraulic elements (7.2.0) and the pressure in the rest of the hydraulic system (7.2.1), (7.2.2), (7.2.3) and (7.2.4) increases. If this pressure exceeds the preset gas pressure in the gas-filled diaphragm accumulator (7.2.3), the valve (7.2.4) of the diaphragm accumulator (7.2.3) opens and the hydraulic fluid can flow back into the diaphragm accumulator from (7.2.0). Since the fluid is viscous, energy is dissipated when the fluid flows, and this leads to a damping force between the hydraulic stop and the impulse mass. If the pressure drops again because the impulse mass is decelerated and moves out of the hitting position again, the liquid leaves the diaphragm accumulator (7.2.3). From a particular pressure, the valve of the diaphragm accumulator closes and the liquid flows through the throttle (7.2.2) and/or the hose (7.2.1) back into the elastomeric-hydraulic element (7.2.0). Energy is also dissipated when the liquid flows back. The characteristic load—displacement behavior for this element is shown in FIG. 6.

If there is no hit, only a small inlet pressure can be set in the elastomeric-hydraulic element (7.2.0). Due to the low pressure in the hydraulic system, there is a risk that, in the event of a hit, cavitation will occur in the throttle (7.2.2) meaning that the stop cannot fulfill its function. If a long hose (7.2.1) is used as an energy dissipating resistor instead of or in addition to the throttle, the risk of cavitation is reduced. Cavitation occurs above all where the speed of the liquid is increased due to a large change in cross section and thus the pressure drops locally below the vapor pressure of the liquid. Gas can form in these points and the stop will no longer function. The outgassing of gases dissolved in the water exacerbates this situation. By using a long hose, damping is generated without gas formation in the liquid.

By selecting suitable valve circuits, other characteristic curves can also be generated. This depends very much on the application.

For example, commercially available hydraulic dampers connected by valves can be used, for which dampers the desired characteristic curves can be set. However, these dampers have the disadvantage that they can absorb loads only in one direction. The elastomeric-hydraulic system (7.2) according to the invention having the elastomeric-hydraulic element (7.2.0) can also absorb radial loads.

According to the invention, the moving mass (3) is mounted so that it can slide vertically from above on the support arms (2.2), optionally via appropriate guides. However, it is also possible to use appropriate rolling elements.

In the case of a three-arm support device, at least three sliding devices (4) are necessary. In this case, the sliding elements (4.1) (4.2) (4.3) (4.4) (4.5) (4.6) have to be arranged at 120° to each other, if possible. It is sufficient to provide one sliding device per support arm. However, on each arm there can also be two or more sliding units between the moving mass (3) and the particular support arm.

A sliding device (4) according to the invention is composed, on the moving mass (3) side, for example of a sliding plate (4.3) and optionally a compensating element (4.4), which are fastened to the moving mass (3) via the mounting plate (4.2). The compensating element (4.4) is not absolutely necessary, but helps to compensate for any deviations in parallelism between the moving mass (3) and the upright part (2). The compensating element is therefore intended to ensure that the two components sliding one on the other (mass, support device) always remain arranged horizontally, even if the sliding layers are worn irregularly due to the friction generated.

The upright counterpart of the sliding device according to the invention, which counterpart is fastened to the support device (2), is the sliding metal sheet/friction metal sheet (4.1), which are fastened to the star (2) or to the support arms (2.2) thereof, optionally via an additional intermediate or friction plate (4.5) and a connection plate (4.6).

The vertical gravitational force and other acceleration forces are introduced via the sliding element into the star (2.2), into the tower connection (2.4), into the tower flange (2.1) and finally into the tower (not shown).

The sliding metal sheet (4.1) and the sliding plate (4.3) move relative to one another in the horizontal plane. There is no vertical relative movement.

The friction between the sliding plate (4.3) and the sliding metal sheet (4.1) is determined by the bearing load and the coefficient of friction. The selection of the sliding material of the sliding plate (4.3.) or of the friction plate (4.5) determines the coefficient of friction.

For the desired application in a wind turbine, friction coefficients in the range between 0.05 and 0.6 are possible. If a coefficient of friction of 0.05 is selected, the relative movement between the mass (3) and the structure starts at 0.5 m/s$^2$ acceleration of the structure (e.g., the tower). For a coefficient of friction of 0.4, the mass (3) moves only at 3.9 m/s$^2$ structure acceleration. The coefficient of friction has to be selected depending on the installation and operating mode. If the mass damper is intended to work only at large amplitudes, a large coefficient of friction can be selected. A better effect of the impulse mass damper according to the invention is achieved with a smaller coefficient of friction, preferably between 0.05 and 0.1.

The relative movement of the moving mass (3) with respect to the upright part (2) is limited according to the invention by said stop elements (7.1) or (7.2), which are preferably arranged in a tangential direction. The stop elements act only unidirectionally and in the tangential direction.

The stop elements (7) (7.1) (7.2) are intended always to be arranged such that one or two stop elements are present on both sides of a star arm so that the moving mass (3) can hit in both directions.

The selection of rubber geometry, stiffness and damping determine the effectiveness of the system. The distance between the stop elements and the particular opposite side is also important. This distance is called the free displacement. If a hit occurs, the rubber elements spring in and decelerate the moving mass (3) so that it comes to a stop after a particular spring displacement. At least two stop elements are always used in the event of a hit.

Upon hitting, energy is dissipated by the damping of the rubber and energy is stored by the resilience of the rubber. The stored energy leads to the moving mass (3) being accelerated out of the hitting position again. If the rubber stiffness and damping as well as the available displacement, the moving mass (3) and the coefficient of friction are matched to the structure (tower, tall, slim building, wind turbine), excitation vibrations can be reduced.

If it is desired for the impulse mass damper system according to the invention to be effective in a horizontal plane, at least three pairs of unidirectional stop elements should preferably be arranged at approximately 120° to one another, as shown in FIG. 1/FIG. 2. The cylinder axes of the stop elements (7) (7.1) (7.2) can in principle be oriented radially or tangentially to the star-shaped support device (2) (2.2). It is important that the stop elements can cover both horizontal directions at the same time.

The tangential orientation of the unidirectional stop elements has the advantage over radial orientation that a smaller installation space is required. For the tangential arrangement, the stop elements can easily be arranged on the same diameter as the mass. Said elements therefore do not protrude inward or outward beyond the mass. The selected arrangement of unidirectional stop elements also means that circular movements of the tower can be damped. In other known solutions of the prior art, when the moving structure moves in circular movements, the damping mass rests constantly in the hitting position and thus has only a very small effect. Only the arrangement according to the invention, as can be seen in FIG. 1 or FIG. 2, repeatedly causes hitting events during a circular movement of the structure (e.g., tower of a wind turbine in the wind), which events lead to damping of the structure. The effect of circular movements is not necessarily due to the tangential arrangement, but rather to the fact that the stop elements are not arranged centrally according to the invention and that there is a distance between the different pairs of stop devices (7). For a continuous ring of externally arranged stop elements, the circular movement of the structure could not be damped as effectively As already mentioned, the impulse damper according to the invention in practice usually has a locking means which is intended to prevent the mass from moving if this is not desired in particular situations. The locking means (3.1) of the moving mass (3) can for example comprise one or more screw jacks having a motor, which are equipped with corresponding clamping devices (e.g., hooks) that can be extended and retracted radially. The hooks are integrated and mounted in the I-beam. The hooks are equipped with stop elements or rubber rollers on the inside so as not to damage the moving mass (3) during the locking process. If the moving mass (3) is to be locked, the hooks are retracted and the hooks prevent any movement of the moving mass (3) relative to the upright support device (2). The locking system can be operated electrically and in a remote-controlled manner, electrically with on-site control, or manually. The electric motors are equipped with a brake to prevent unintentional shifting of the hooks. At the same time, the screw jacks are self-locking so that the hooks can only be shifted by the motor of the screw jack. Due to the self-locking, forces from the direction of the hook do not lead to shifting of the hook.

The hooks may also be cables pulled by the screw-jack-motor unit. Although the cables can only transmit tensile forces, compressive forces are not necessary for the locking means to be used. The three cables can also be pulled in or relaxed via a central roller-and-drive unit.

The invention claimed is:

1. An impulse damper device for damping vibrations in an installation, which occur during construction or disassembly of a structure made of individual segments, said device comprising:
   (i) a fixed support device (2) having three or more support arms (2.2) that are interconnected at a first end while an opposite free end extends outward in a star shape with respect to one another and are arranged in a horizontal plane,
   (ii) a movable mass (3) comprising one or more parts is arranged above or below or between the two or more support arms (2.2) of the horizontally oriented support device (2), and the movable mass (3) is mounted movably relative to said support device,
   (iii) at least one sliding or rolling device (4) which is arranged and designed to allow relative movement between the support device (2) and the movable mass (3), and
   (iv) at least one stop device (7), provided for the movable mass (3) to hit the fixed support device (2), thereby causing the vibrations that have occurred in the installation to be reduced or eliminated by impulse damping by the mass being moved by applied forces hitting the fixed support device,
   wherein the stop device (7) is arranged such that:
   (a) the mass (3) cannot be rotated about a vertical axis of the impulse damper, as a result of which a torsional moment about the vertical axis is transmitted, and
   (b) said stop device is functionally effective in a tangential direction relative to a longitudinal axis of the structure.

2. The impulse damper device according to claim 1, wherein the movable mass (3) comprises one or more parts that form a closed ring which is movably connected, via said stop device and said at least one sliding or rolling device (4), to the free ends of the support arms (2.2) of the support device (2).

3. The impulse damper device according to claim 1, wherein the mass (3) can be moved, via said at least one sliding or rolling device (4), in an outer region of the radially outwardly extending support arms (2.2) of the support device (2).

4. The impulse damper device according to claim 1, where-in a first sliding or rolling device of the at least one sliding or rolling devices (4) is attached to the moving mass (3) and a second sliding or rolling device (4) is attached to one or more support arms (2.2) of the support device (2).

5. The impulse damper device according to claim 4, wherein the at least one sliding/ or rolling device (4) comprises a compensating device (4.4) which ensures parallel guidance of elements (4.1, 4.2, 4.3) of the sliding or rolling device (4) on the moving mass (3) and on the support arms (2.2) in an event of wear of said elements during operation.

6. The impulse damper device according to claim 1, wherein a coefficient of friction of the at least one sliding/ friction device (4), between the support device (2) and the moving mass (3), has a value between 0.05 and 0.6.

7. The impulse damper device according to claim 1, wherein the stop device (7) has stop elements (7.1, 7.2) which are attached to the support arms (2.2) of the support device (2) and/or to the moving mass (3).

8. The impulse damper device according to claim 7, wherein said stop elements (7.1, 7.2) of the stop device (7) are arranged in a tangential direction with respect to the longitudinal axis of the structure, in each case a first stop element is attached to the movable mass (3) and a second stop element is attached to the opposite part of the fixed support element (2) (2.2), and these stop elements are separated from one another by a movement space (5) which is closed when the impulse damping occurs.

9. The impulse damper device according to claim 7, wherein the stop elements (7.1, 7.2) of the stop device (7) comprise resiliently damping elements or resiliently/hydraulically damping elements.

10. The impulse damper device according to claim 9, wherein said resiliently damping elements or resiliently/ hydraulically damping elements comprise flat layer elements or (7.1.1, 7.1.2) made of elastomer-metal materials.

11. The impulse damper device according to claim 10, wherein said flat resilient layer elements (7.1.1) (7.1.2) are vertically oriented.

12. The impulse damper device according to claim 9, wherein said resiliently damping elements or resiliently/ hydraulically damping elements (7.1, 7.2) comprise corresponding cone or socket elements made of metal-elastomer materials.

13. The impulse damper device according to claim 1, wherein the impulse damper device comprises a mechanical or electronic, manual or remote-controlled device (3.1) for locking the moving mass (3) with respect to the support device (2) or the structure.

14. The impulse damper device according to claim 1, wherein the support device (2) has fastening elements (2.1) by which the support device (2) is capable of being securely but optionally re-releasably connected, directly or via a correspondingly designed flange (1), to the structure or to an uppermost segment of the structure.

15. The impulse damper device according to claim 1, wherein the impulse damper device is reusable.

16. An under-construction wind turbine comprising the impulse damper device according to claim 15.

17. A method for damping vibrations in a wind turbine during the construction or disassembly of a tower, a nacelle or rotor blades of the wind turbine, the method comprising
(A) providing an impulse damper device that comprises a fixed support device (2) having three or more support arms (2.2) that are interconnected at a first end while an opposite free end extends outward in a star shape with respect to one another and are arranged in a horizontal plane,
  (i) a movable mass (3) comprising one or more parts is arranged above or below or between the two or more support arms (2.2) of the horizontally oriented support device (2), and the movable mass (3) is mounted movably relative to said support device,
  (ii) at least one sliding or rolling device (4) which is arranged and designed to allow relative movement between the support device (2) and the movable mass (3), and
  (iii) at least one stop device (7), provided for the movable mass (3) to hit the fixed support device (2), thereby causing the vibrations that have occurred in the installation to be reduced or eliminated by impulse damping by the mass being moved by applied forces hitting the fixed support device,
  wherein the stop device (7) is arranged such that:
    (a) the mass (3) cannot be rotated about a vertical axis of the impulse damper, as a result of which a torsional moment about the vertical axis is transmitted, and
    (b) said stop device is functionally effective in a tangential direction relative to a longitudinal axis of the structure, and
(B) mounting said impulse damper device on an uppermost segment of the tower or on the nacelle during the assembly or disassembly of the wind turbine.

* * * * *